Patented Dec. 8, 1931

1,835,237

UNITED STATES PATENT OFFICE

CHARLES C. MOORE, OF SAN FRANCISCO, CALIFORNIA

PROCESS OF DESULPHURIZING FRUIT

No Drawing. Application filed September 16, 1929, Serial No. 393,136. Renewed October 24, 1931.

This invention relates to the treatment of fruits that are freshly cut into two or more parts and reduced to a dried form, and more particularly to the treatment of the freshly-cut fruit with sulphur dioxide for the purpose of arresting enzymic activity that naturally develops when cut fruit is exposed to the action of drying air, and the subsequent removal of substantially all or a part of the sulphur dioxide constituent thereby introduced into the fruit. Apricots, peaches, pears, apples are illustrations of a fruit that can be so conditioned for easy handling and long preservation while maintaining the natural color and flavor of the fruit, yet be so reduced in the content of the ingredient, sulphur dioxide, as to be suitable for human consumption.

In the United States Patent No. 1,633,823 granted me June 28, 1927, the fruit under treatment is raised to the desired temperature by use of a water-jacketed chamber with hot water or steam circulating through the jacket to warm the fruit in the chamber. My improvement consists in a method of quickly bringing the fruit under treatment to the desired temperature, thereby expediting the treatment for desulphurizing the fruit; and the further improvement in having a higher content of moisture retained in the fruit during and after the desulphuring treatment.

This improved method of bringing the fruit under treatment to the desired temperature and moisture condition is applicable to all those fruits in which enzymic action develops when the freshly cut fruit is exposed to the action of drying air, causing the fruit to darken in color, and by "fruit" as hereinafter used, is meant all products of vegetable growth in which such action develops. To preserve such fruit for future use it has long been the custom to cut the fruit into two or more parts and subject the cut fruit to the drying action of air, heated either naturally, as by the sun's rays (commonly called "field drying") or artificially, (commonly called "dehydrating"), the term "dehydrating" being hereinafter used as a generic term to include both methods of drying. The effect of such exposure of cut fruit to the warm air is to dehydrate or reduce the moisture thereof to a stage where it may be preserved over quite a long period of time. However, the dried fruit, after such treatment, loses its natural color to such an extent that it is darkened, and unattractive to the eye, because of which its market value is greatly depreciated. It is long since known that this discoloration is the result of enzymic action which develops in freshly-cut fruit and during dehydration or drying, but not to any substantial extent in the dried fruit. It is also known that such enzymic action can be arrested by subjecting the freshly-cut fruit, before dehydrating, to the action of a gaseous product resulting from burning sulphur, chemically known as sulphur dioxide, or $SO_2$, and which will be hereinafter referred to by its chemical formula. By this treatment with the fumes of burning sulphur, before dehydrating, the natural color is retained in the dried fruit, but it has been found that the fruit contains $SO_2$ in such proportion, according to food experts, as to be unsuited to human consumption, for which reason some Governments have made and are enforcing regulations requiring that the $SO_2$ content of food products shall not exceed 1,000 parts per million by weight. The process of sulphurizing the freshly-cut fruit is necessary to give it market value, and no practical substitute for this process has been discovered up to the present time, yet it is generally known that dried fruit as packed for human consumption has an $SO_2$ content greater than that above indicated, frequently more than 3,000 parts and seldom less than 2,000 parts per million. Efforts to have the finished fruit lower in content of $SO_2$ by diminishing the amount of sulphur burned in treating the fruit have resulted in depreciating the quality of the finished product, such as its color, texture, etc. The problem presented therefore is to secure the full benefit of sulphurizing for the arresting of enzymic activity in the fruit, yet to have a finished dried fruit with an $SO_2$ content well below the limit or tolerance as fixed by food experts, and desired by the Governments of most of the great nations, and required by many of these Governments, such as Great Britain, France, Germany, Austria, etc., according to the tolerance as fixed by the food experts of such nations. Food experts of all great nations recognize the harmful effects of an excessive content of sulphur dioxide, though in some instances the enforcement of existing food regulations as to the tolerance of $SO_2$ in fruit is, temporarily, being held in abeyance, pending the opportunity for improvement in the production of such dried fruits to comply with the tolerance, and my invention is one solution of this problem, and the only one up to the time of my discovery as set forth and explained in the aforesaid patent, and my improved method of raising the fruit to the desired temperature for desulphurizing to be now disclosed.

When freshly-cut fruit is properly sulphurized before dehydrating, the juices of the fruit absorb $SO_2$ such that it permeates the fruit completely, thereby arresting enzymic activity. If the fruit is not properly sulphurized, the enzymic activity is not properly arrested. Immediately after the sulphurizing treatment the fruit is much higher in content of $SO_2$ than after dehydrating, if computed on the same moisture basis in each instance, much of the $SO_2$ escaping during the dehydrating operation. Also, the $SO_2$ continues to slowly escape from the fruit after it is dehydrated, and it could be assumed that, within a reasonable length of time, enough of the $SO_2$ would escape from the finished fruit to bring it within the limits of tolerance as fixed by food experts, but the assumption is not correct, as may be readily determined by chemical analysis. It is commonly known that fruit, properly sulphurized before dehydrating, continues to retain from 3,000 to 5,000 parts per million of $SO_2$ for a considerable period of time after dehydrating, even though the $SO_2$ is slowly escaping from the dehydrated fruit. Though this is known to be a fact, yet it is not known by what manner or what means the $SO_2$ is held in the fruit.

My discovery that fruit, which has been sulphurized and then dehydrated, may be rapidly lowered in $SO_2$ content by treatment in vacuo, and that the time and effect of such treatment in vacuo is greatly expedited by raising the temperature of the fruit during treatment, is enhanced by my improved method of raising the fruit to the desired temperature, quickly, yet confining the temperature to limits that are not detrimental to the fruit as hereinafter explained.

It is generally known that a material treated in vacuo, such as dried fruit, acquires heat only through contact with a heated substance, due to the absence of an aeriform conductor for transmitting the heat. In the instance where a water-jacket chamber is used for treatment of the fruit in vacuo, as done in the aforesaid patent, the fruit acquires temperature by contact with the walls of the chamber which walls are heated by the water in the jacket of the chamber, the chamber revolving so as to bring the fruit, by means of cascading plates fixed along the walls of the chamber, in contact with the chamber walls such that all of the fruit will, for uncertain intervals of time, be brought in contact with the chamber walls to acquire the desired temperature in the fruit, such as about 70 degrees cent. In order to give the fruit such a temperature, while in vacuo in a water-jacketed chamber, there is required a period of from two to eight hours, according to the condition of the fruit under treatment, thereby extending the desulphurizing operation by that amount of time. By my improvement in the method of raising the temperature of the fruit to the desired degree, I reduce the time required for this purpose to a matter of minutes, such as two to eight minutes rather than two to eight hours. And a further improvement lies in imparting moisture to the fruit while in vacuo, such that the same fruit, after treatment for desulphurizing will weigh slightly more than before treatment, due to moisture retained in the fruit by my improved method of raising the fruit to the desired temperature while in the chamber. This is in marked contrast to desulphurizing in the water-jacketed chamber, as set forth in the aforesaid patent, wherein the desulphurizing procedure lowers the moisture content of the fruit under treatment and necessitates a subsequent addition of moisture restoration to the normal content of finished dried fruit such that the fruit will have the pliability and texture to which consumers are accustomed. To expedite the desulphurizing procedure is eminently desirable, for the reason that commercial operations often require that a car load or more (25 to 50 tons) be treated in one day of nine hours working time. A commercial custom is to store the dried fruit as received from the growers in storage bins prior to packing in 25 pound boxes for shipment. During the time the fruit is in the storage bins, it is desirable to have it not in a desulphurized condition for the reason that the sulphur dioxide already in the fruit serves to prevent insect larva developing, mold, etc. When an order is received for a car load of finished fruit, the fruit, if having been in storage bins, is made to pass under a spray of water to free it of adhering dust, etc., after which it is usually subjected to fumes of sulphur dioxide for the purpose of destroying insect eggs, etc., and to withstay any enzymic action that may develop in the wet fruit and cause it to darken in color. This resulphurizing the washed fruit, as is termed the sulphurizing procedure in the packing houses, necessarily increases the sulphur dioxide content of the fruit to a very considerable extent over what it already has before resulphurizing. For this reason, it is obvious that the desulphurizing procedure should not be undertaken before the washing and resulphurizing has been done; that is to say, the desulphurizing operation should be the final treatment of the fruit prior to packing. In consequence, the desulphurizing procedure must keep pace with the washing and packing of the fruit as taken from the storage bins, being usually at the rate of a car load per day. And any improvement lending to expedite the desulphurizing operation such that but a few units of the desulphurizing equipment are required to keep pace with the packing equipment, is a decided saving in the outlay for plant equipment.

The desulphurizing procedure is but an additional step interposed, at the logical time, in the usual sequence of steps necessary for bringing a fresh and perishable fruit, such as apricots, peaches, etc., to a dried form readily preserved, yet well suited for use as a human food. In brief, the sequence of steps is: (1) Exposing the cut fruit to the fumes of burning sulphur for the purpose of arresting enzymic action, known as sulphurizing; (2) drying the fruit to a moisture content where it is preserved, known as dehydrating; (3) removing the sulphur dioxide from the dried fruit in order to make it suitable for use as a human food, known as desulphurizing. As above explained, after the completion of step (2) it is frequently desirable to store the fruit in storage bins for an indefinite period of time, depending upon markets, etc., thereby postponing step (3) desulphurizing. When this is done, insects, dust, etc., get in the fruit while in the storage bins, and fruit sometimes dries out more than is desired, necessitating it being "processed", as the operation of washing and resulphurizing dried fruit is generally known, prior to packing. This "processing" step is an incidental step in the making of dried fruit for use as human food; it is dependent upon the incidental storage of the dried fruit before it is packed for shipment. As is obvious, step (1) sulphurizing the freshly cut fruit, and step (2) dehydrating, are in necessary sequence, while step (3) desulphurizing, may be undertaken immediately following dehydrating, or may be postponed until after the incidental step of "processing" has been completed in instances where the dried fruit has been kept in storage bins prior to packing. Accordingly, in this specification, it is taken that the preparation of a dried fruit, such as peaches, apricots, etc., comprises three essential steps; sulphurizing the freshly cut fruit; dehydrating and desulphurizing; and that the incidental step referred to as "processing" is not necessarily considered as entailed in the appended claims of this application for patent, though in all instances wherein the incidental step of "processing" has been taken, it is to be understood that this step, though not cited as being taken in the preparation of dried fruit as a human food, is involved in the appended claims as read, in all instances wherein the incidental step of "processing" may have been involved for any sufficient reasons.

I prefer to make use of a heating medium in an aeriform state, such as steam, hot air, hot gases, or mixtures of such mediums; and of varying degrees of pressure in the application of the heating medium, and for varying periods of time and intervals, dependent upon the size and condition of the fruit under treatment together with the purpose in view.

In practice, I use a chamber sufficiently strong to withstand the usual external atmospheric pressure, and also an internal pressure of, possibly, 30 pounds gauge pressure; the chamber having suitable connections and gauges for control of either vacuum or pressure conditions while the fruit is in the chamber; the inclosed fruit being in bulk, or in boxes, or on trays, according to desirability in handling it.

With the fruit suitably inclosed in the chamber, the vacuum connections are opened for a period to not only evacuate the chamber but to evacuate the pores and spaces in the pieces of fruit, thereby permitting more readily the entrance of the heating medium to the interior of the fruit when the heating medium is subsequently permitted to enter and fill the chamber. After the fruit has been in vacuo a suitable period, such as a few minutes, the vacuum connection is closed and the heating medium connection opened, thus lowering the vacuum gauge to zero and raising the pressure gauge to a desired point at which it is maintained for a desired period, whereupon the pressure is released through a suitable connection, and the vacuum connection again opened. This brings about a very satisfactory heating of the fruit internally as well as externally.

If the pieces of fruit are rather large or impervious more than usual, I find a gauge pressure of 15 to 25 pounds can be maintained for a period of two or three minutes, yet the fruit does not acquire an injurious temperature, such as 75 degrees cent., even though the heating medium has a temperature of about 115 degrees cent. With the pressure released and the vacuum connections opened, the temperature of the heating medium lowers rapidly, such that when the vacuum gauge reads 25 inches (mercury), the temperature of the heating medium surrounding and enclosed in the fruit is lowered to 56 degrees cent., being well below the inversion point of the fruit sugars yet at the vaporization point of water in vacuo.

In the instance where the fruit is more sensitive to heat, and absorbs heat rapidly, I apply the heating medium at lower pressure, or for a shorter period of time. In some instances, I find it unnecessary to have the heating medium applied under pressure, it being sufficient to have the heating medium connection opened only until the vacuum gauge reads zero, in which instance the surrounding and inclosed heating medium can not have a temperature exceeding 100 degrees cent., and maintain this condition until the fruit is raised to a temperature of about 70 degrees cent., whereupon the vacuum connection is again opened. In this instance, where pressure is not applied, reliance is had upon normal atmospheric pressure conditions to have the heating medium permeate the fruit. Obviously, the lower the temperature of the heating medium the longer it is to be maintained to impart a temperature to the fruit; and, obviously, the higher the pressure is applied, the more thoroughly will the heating medium permeate the pieces of fruit.

When the sole means of heating the fruit is through the use of a heating medium in an aeriform state, the heating procedure may be repeated at suitable intervals to expedite the operation. As generally known, evaporation of moisture from a substance results in lowering the temperature of that substance, therefore when the temperature of the fruit has lowered to a point that retards vaporization in vacuo, the vacuum connection is to be closed and the heating medium connection opened for a suitable period and pressure, after which these connections are closed and the vacuum connection opened; that is to say, the operation of heating the fruit is repeated, at suitable intervals, during the time the fruit is being desulphurized in the chamber.

This permeation of the fruit by a heating medium in aeriform state, has the additional advantage of causing the pieces of fruit to expand, due to the expansion of the vapor enclosed in the fruit when the vacuum connection is opened, thereby lowering the external pressure of the fruit as is the case in vacuo. The pieces of fruit expand to from one and one-half to double in size, and are soft and pliable, and otherwise desirable as a finished fruit. And, due to its elasticity, the finished fruit can be compacted, under pressure, in suitable containers. Another procedure is to have the fruit confined in suitable containers when it is first placed in the chamber for treatment, whereupon the expanding fruit merges into a rather compact mass such as the usual package of pressed figs.

An additional advantage lies in the use of steam as the heating medium in aeriform state, wherein some of the steam condenses in the fruit to increase the moisture content of the finished fruit equal to that or above the moisture content existing in the fruit before subjecting it to the desulphurizing procedure. My investigations have shown that the fruit after subjection to a steam pressure of 15 pounds gauge pressure, immediately followed by subjection to vacuum conditions for a period of but two or three minutes, the fruit is increased in weight to the extent of several percent. With the fruit so treated by steam, followed by one hour of treatment in vacuo, most of this moisture supplied by the condensed steam in the fruit is removed, and the fruit is much lowered in temperature, due to vaporization of the moisture. Obviously, the moisture content of the finished fruit can be varied by varying the time the fruit is allowed to remain in vacuo.

The term "gaseous medium" used in the appended claims to describe the medium which is brought into contact with the fruit to raise it to the desired temperature, includes air or other suitable gases, steam, vapor and mixtures thereof.

From the above description it will be clear that I have devised a method of expediting the treatment of fruit of the character indicated which will result in a dried fruit having its natural color and flavor and desired moisture content, but free from a deleterious amount of $SO_2$ and which may be kept in such condition for a long period of time. The different factors of the process may be varied in degree, and substitutions may be made without departing from the principles above described. It is, therefore, to be understood that my invention is not to be confined to the details disclosed but includes all departures therefrom falling within the terms of the appended claims.

What I claim is:

1. The process of desulphurizing fruit which has been sulphurized to withstay enzymic activity, which consists in heating the sulphurized fruit, while enclosed in a vacuum chamber, by bringing a gaseous medium into contact therewith, and thereafter withdrawing such medium and subjecting the fruit to vacuum conditions until the $SO_2$ content of the fruit is reduced to a desired extent.

2. The process set forth in claim 1 in which the heating medium, while in contact with the fruit, is put under pressure.

3. The process set forth in claim 1 modified by successively heating the fruit and subjecting it to vacuum conditions in a plurality of cycles.

4. The process of desulphurizing fruit which has been sulphurized to withstay enzymic activity, which consists in heating the sulphurized fruit, while enclosed in a vacuum chamber, by bringing steam into contact therewith, and thereafter withdrawing the steam and subjecting the fruit to vacuum conditions until the $SO_2$ content of the fruit is reduced to a desired extent.

Signed by me this 10th day of September, 1929.

CHARLES C. MOORE.